(No Model.) 2 Sheets—Sheet 2.
R. W. THICKINS.
MOTOR MECHANISM FOR STREET CARS.
No. 467,693. Patented Jan. 26, 1892.
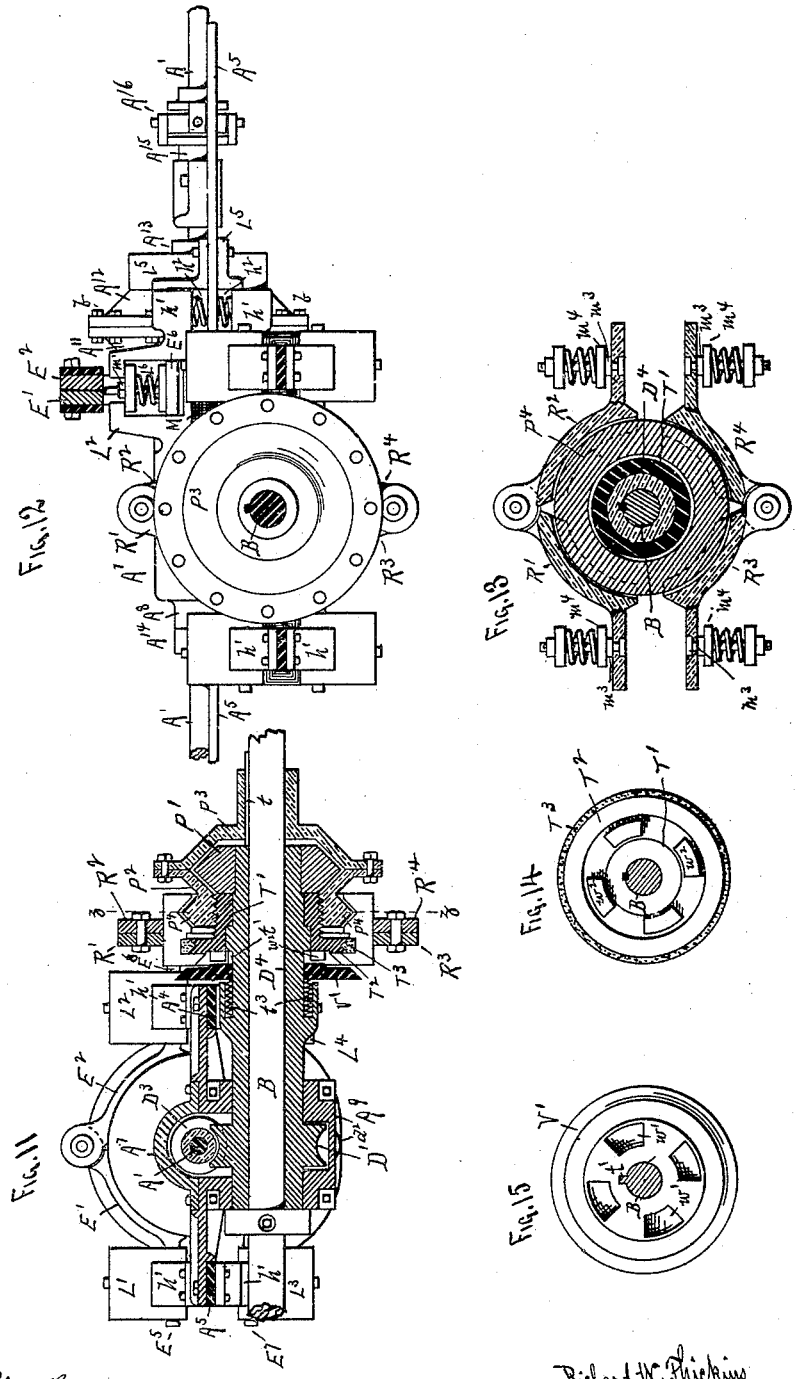

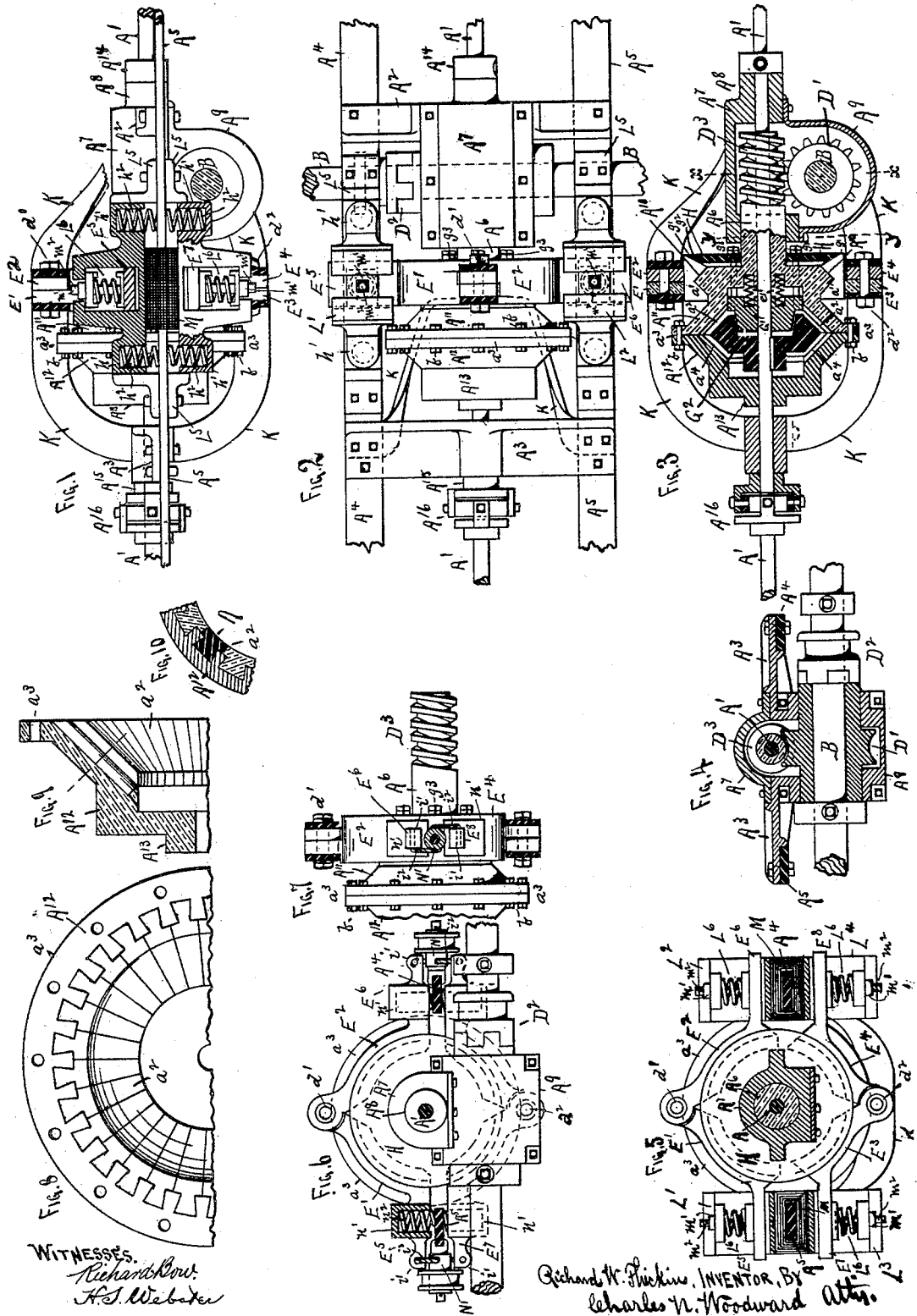

UNITED STATES PATENT OFFICE.

RICHARD W. THICKINS, OF MINNEAPOLIS, MINNESOTA.

MOTOR MECHANISM FOR STREET-CARS.

SPECIFICATION forming part of Letters Patent No. 467,693, dated January 26, 1892.

Application filed April 20, 1891. Serial No. 389,549. (No model.)

*To all whom it may concern:*

Be it known that I, RICHARD W. THICKINS, a citizen of the United States, residing at Minneapolis, in the county of Hennepin and State of Minnesota, have invented certain new and useful Improvements in Motor Mechanism for Street and other Cars, of which the following is a specification.

This invention relates to street and other cars; and it consists in the construction and mode of operation of the mechanism whereby the power of the electric or other motor is applied to the axles, as hereinafter shown and described, and specifically pointed out in the claims.

In the drawings, Figure 1 is a side elevation. Fig. 2 is a plan view. Fig. 3 is a longitudinal sectional side elevation. Fig. 4 is a cross-sectional view on the line $x\,x$ of Fig. 3. Fig. 5 is a cross-sectional view on the line $y\,y$ of Fig. 3. Fig. 6 is an end elevation, and Fig. 7 is a semi-sectional side elevation, showing a modification in the manner of compressing the brake-shoes. Figs. 8, 9, and 10 are enlarged sectional details illustrating the manner of forming the wood lining of the double-surface clutch-casing. Fig. 11 is a longitudinal sectional side elevation, and Fig. 12 is an end elevation, of the clutch mechanism for connecting the axle to the motor. Fig. 13 is a cross-sectional view on the line $z\,z$ of Fig. 11. Figs. 14 and 15 are detail views of the screw-collar and clutch-disk.

$A'$ represents the main shaft of the electric or other motor which is employed to actuate the mechanism, which is suitably mounted upon the truck-frame of the car, and B represents one of the axles of the car. The shaft $A'$ is shown connected by bridge-frames $A^2\,A^3$ to side bars $A^4\,A^5$, the latter suitably connected and braced to the truck-frame. The truck-frame will be of any approved form, but is not shown in the drawings, as it forms no part of the present invention.

Loose upon the axle B is a worm-gear $D'$, which is adapted to be connected to the axle by a sliding clutch $D^2$ of the ordinary construction.

Surrounding the shaft $A'$ is a sleeve $A^6$, having a worm $D^3$ formed on one end and adapted to engage with the worm-gear $D'$, as shown. The sleeve $A^6$ is journaled within the sleeve or casing $A^7$, the latter being formed in one piece with the hub $A^8$ of the bridge-frame $A^2$, which is also one of the journals of the shaft $A'$. Depending from the sleeve $A^7$ and surrounding the worm-gear $D'$ is a casing $A^9$, adapted to hold a supply of oil, within which the gears revolve. The sleeve $A^7$ is formed with a disk $A^{10}$, having a double inclined external friction-surface $a'$, and with another disk or semi-casing $A^{11}$, having an inclined internal friction-surface $a^2$.

$A^{12}$ is another disk or semi-casing corresponding to the disk or casing $A^{11}$, the two parts $A^{11}\,A^{12}$ connected at their rims $a^3$ and with an internal friction-surface $a^4$ in the part $A^{12}$, corresponding to but inclined in the opposite direction to the surface $a^2$, and journaled by its hub $A^{13}$ upon the shaft $A'$.

The parts $D^3$, $A^{10}$, and $A^{11}$ are all in one piece, and the parts $A^{12}$ and $A^{13}$ are in one piece, and the part $A^{11}$ is united by bolts $b$ to the part $A^{12}$, as shown, so that they will all be firmly held together and free to revolve upon the shaft $A'$, while at the same time be held concentrically thereon. These parts will also have a small degree of end movement on the shaft $A'$ between the bridge-frames, as shown. The shaft $A'$ will be held from end play by collars $A^{14}\,A^{15}$ outside the bridge-frames $A^2\,A^3$. Enclasping the disk $A^{10}$ are four concaved brake clamps or shoes $E'\,E^2\,E^3\,E^4$, two above and two below, the shoes $E'\,E^2$ united at their meeting points by a pivot $d'$ and the shoes $E^3\,E^4$ united at their meeting points by a pivot $d^2$, as shown. The free ends of these shoes are turned off horizontally, as shown at $E^5\,E^6\,E^7\,E^8$, and project above and below the side bars $A^4\,A^5$, the latter being secured by their ends, as before stated, to the frame-work of the trucks. The function of these shoes $E'\,E^2\,E^3\,E^4$ is to compress the disk $A^{10}$ to form a brake to the mechanism, as hereinafter shown, and some means must be provided by which the ends $E^5\,E^6\,E^7\,E^8$ may be compressed toward each other to accomplish the desired result.

Within a central cavity in the part $A^{10}$ is arranged a friction-collar $G'$, surrounding the shaft A' and running loosely thereon and adapted to move back and forth within the part $A^{10}$, but caused to turn therewith by feather-keys or other suitable means and with tapered outer surfaces, as shown.

$G^2$ is a friction-clutch head fast upon the shaft A', and with doubly-inclined outer surface adapted to engage alternately with either of the inclined internal surfaces $a^2$ $a^4$ of the parts $A^{11}$ or $A^{12}$, according as the motor is running forward or backward, as hereinafter explained.

The collar G' and part $A^{10}$ are provided with cavities in their adjacent faces, in which springs $e'$ are inserted to keep the collar normally pressed outward in contact with the clutch-head $G^2$, the latter having a tapered interior to correspond with the tapered exterior of the collar G', as shown.

The inner surfaces of the shoes $E'$ $E^2$ $E^3$ $E^4$, as before stated, are concaved to conform to and fit over the convex outer surface of the part $A^{10}$, and the sides of these shoes next the worm $D^3$ or opposite to the collar G' are formed with a reversed inclined surface $g'$, adapted to receive the corresponding inclined rim $g^2$ of a disk H, the latter surrounding the sleeve $A^6$ loosely and connected by bolts $g^3$ to the collar G'. By this means, when the shoes $E'$ $E^2$ $E^3$ $E^4$ are compressed, the inclined surfaces $g'$ will be converged toward the center and act upon the corresponding inclined surface $g^2$ and force the disk H away from the part $A^{10}$, and, by means of the bolts $g^3$, withdraw the collar G' from contact with the clutch-head $G^2$. The shoes will be firmly braced and supported from their pivotal points $d'$ $d^2$ by braces K, as shown, connecting them to the bridge-frames $A^2$ $A^3$ or to the side bars $A^4$ $A^5$, as may be found most convenient. Embracing the horizontal ends of the shoes are frames $L'$ $L^2$ $L^3$ $L^4$, each of the ends of the shoes having its own independent frames, and surrounding the side bars $A^4$ $A^5$, between the adjacent frames $L'$ $L^2$ $L^3$ $L^4$, are electric coils M, adapted, when electrically energized, to attract the frames and compress the brake-shoes. The outer ends of the frames $L'$ $L^2$ $L^3$ $L^4$ are formed with housings $h'$, supporting springs $h^2$ within them to bear upon opposite sides of the side bars $A^4$ $A^5$ and keep the shoes normally distended and out of contact with the part $A^{10}$. The frames $L'$ $L^2$ $L^3$ $L^4$ are held from lateral movement upon the side bars $A^4$ $A^5$ by stops or brackets $L^5$, but are free to rise and fall between the brackets. The coils M will be insulated from the bars $A^4$ $A^5$ and will be connected by suitable conducting-wires to the magnets or other suitable parts of the motor.

Above each of the ends $E^5$ $E^6$ and beneath each of the ends $E^7$ $E^8$, within the frames $L'$ $L^2$ $L^3$ $L^4$, are arranged coiled springs $L^6$, adapted to be adjusted by adjusting-nuts $M'$ $M^3$ and bolts $M^2$, so that the tension of the springs may be regulated, thereby allowing the frames $L'$ $L^2$ $L^3$ $L^4$ to be attracted into close contact with electric coils M, whose attractive force will always be greater than will ever be required to be applied to the brake-shoes.

The pressure of the brake-shoes upon the brake-disk $A^{10}$ will be predetermined by adjusting the nuts $M'$ $M^3$ to any degree of pressure required. Another nut $M^3$ should be used on the bolts $M^2$, between the ends $E^5$ $E^6$ $E^7$ $E^8$ and the spring-sockets $m^4$, to compress the springs $L^6$ away from said ends in adjusting the pressure to be applied by the brake-shoes. (See Fig. 13.)

In Figs. 6 and 7 I have shown a modification in the manner of actuating the shoes $E'$ $E^2$ $E^3$ $E^4$, consisting in providing the ends $E^5$ $E^6$ $E^7$ $E^8$ with small housings $n'$ to support coiled springs $n^2$ to press upon opposite sides of the side bars $A^4$ $A^5$, by which means the shoes are pressed normally outward away from the disk $A^{10}$. Between the extremities $i'$ of the ends $E^5$ $E^6$ $E^7$ $E^8$ are journaled upon the side bars small rollers or drums $N'$, having short cords $i^2$ connecting their opposite sides with the extremities $i'$, so that the revolution of the drums will draw the shoes toward each other and thus compress them upon the disk $A^{10}$. When the drums $N'$ are released, the springs $n^2$ will force the shoes outward again and release the part $A^{10}$ and disk H, as before described.

Any suitable means may be employed to actuate the drums $N'$, such as cords running to the platform, convenient to the hand of the operator.

The motor which actuates the shaft A' may be placed at any convenient point and supported in any suitable manner from the truck-frame. The motor may be set at any height with relation to the axles or truck by employing a universal joint $A^{16}$ in the shaft A', as shown.

The motor is intended to be run constantly, and when the brake-shoes are released their expansion will release the disks $A^{10}$ and H and permit the springs $e'$ to force the collar G' into the clutch-head $G^2$ and engage therewith, and the clutch-head, revolving with the shaft A', causes the collar G' to revolve with it, and the collar being connected to the part $A^{10}$, causes the worm $D^3$ to revolve upon the worm-gear D'. The first effect of this motion is to cause the worm to be moved endwise, (either to the right or left, according to the direction in which the shaft A' is running,) as the resistance of the whole weight of the car is so much greater than the resistance offered by the force necessary to move the parts $A^{10}$, $A^{11}$, and $A^{12}$ along the shaft A'. This end movement causes the surface $a^2$ or $a^4$, as the case may be, to be forced against the revolving clutch-head with a gradually-increasing force, and thus gradually apply the power of the worm to the worm-gear and correspondingly gradually overcome the inertia of the car, and thus gradually start the car and keep it in motion after it is started.

To stop the car, it is only necessary to apply the power provided for compressing the ends $E^5$ $E^6$ $E^7$ $E^8$ of the brake-shoes when the speed of the parts $A^{10}$ $A^{11}$ $A^{12}$ will be checked, while at the same time the disk H will be forced outward and withdraw the collar G' from its contact with the clutch-head $G^2$, and thus entirely disconnect the motor from the axle, the friction-surfaces of $A^{11}$ or $A^{12}$, as the case may be, being at the same time withdrawn from the friction-surfaces of $G^2$. The brake can be applied or withdrawn as gradually as desired, thereby enabling the operator to stop or start the car very gradually and avoid any sudden jarring or jerking motion.

When the car is to be moved without employing the motor for that purpose, then the clutch $D^2$ will be disengaged.

The interior of the inclined friction-casing will preferably be of wood set into the iron part of the casing in dovetailed sections, as shown in Figs. 8, 9, and 10, this form permitting the wooden sections to be inserted, so as to present the grain of the wood endwise to the friction-head $G^2$, and thereby not only decrease the effect of the wear upon the wood, but also greatly increase the frictional resistance.

The collar G' will preferably be made of paper or other similar suitable substance to increase its holding-power.

The double inclined form of the frictional surfaces of the parts $A^{10}$, $A^{11}$, $A^{12}$, and $G^2$ enable the device to act equally as well, whether the car be running forward or backward, the surface $a^2$ being in action when the car is running in one direction and the surface $a^4$ being in action when the car is running in the opposite direction. This aforesaid arrangement of parts renders them automatic in their action as regards the starting of the car and the adjustment of the amount of friction of the parts $a^2$ $a^4$ $G^2$ upon each other necessary to propel the car under all circumstances. When heavily loaded or when starting up a steep grade, the forced pressing of the frictional parts together is always proportioned automatically to the resistance that the worm-gearing has to overcome in keeping up the established rate of speed, and when the resistance decreases the frictional contact of the parts $a^2$ or $a^4$ and $G^2$ decreases, as the case may be. As the brake-shoes are applied simultaneously upon the friction-disk on the axle, as in Figs. 11 and 12, and on the shaft A', it lessens the labor of the worm-gearing and the pressure of the part $a^2$ or $a^4$ upon the part $G^2$ and the labor that the brake-shoes E' $E^2$ $E^3$ $E^4$ are required to perform.

A mechanism similar to that shown in Fig. 3 may be attached to the axle B in place of the clutch $D^2$ to connect and disconnect the motor mechanism from the axle, as shown in Figs. 11 and 12. This mechanism consists in extending the hub of the worm-gear D' in the form of a sleeve $D^4$ and attaching a double conical-faced collar or disk P' to its outer end, as shown in Fig. 11, this disk forming one member of a friction-clutch. Surrounding this disk P' is a casing formed in two parts $P^2$ $P^3$, similar to the casing $A^{11}$ $A^{12}$, and also provided with a double conical brake-disk $P^4$, similar to the brake-disk $A^{10}$, and surrounded by a set of brake-shoes R' $R^2$ $R^3$ $R^4$, similar to the shoes E' $E^2$ $E^3$ $E^4$, and adapted to be actuated in the same manner. The parts $P^2$ $P^3$ slide loosely upon the axle, but are turned therewith by a feather $t$. Loose upon the sleeve $D^4$, inside the part $P^4$, is a collar T', having an external screw-thread on one end engaging with corresponding internal screw-thread upon the interior of the part $P^4$ and with a disk or flange $T^2$ upon its other end, as shown in Fig. 11. The rim of this disk is concaved and adapted to receive a rubber or other flexible ring $T^3$, with its outer surface pressing against the inner surface of the shoes R' $R^2$ $R^3$ $R^4$. Surrounding the sleeve $D^4$, inside the disk $T^2$, is another disk V', similar to the disk H in Fig. 3, sliding loosely upon the hub extension $D^4$, but adapted to be revolved therewith by a feather $t'$ and provided with cavities $w'$, adapted to receive corresponding lugs $w^2$, projecting from the adjacent face of the disk $T^2$, (see Figs. 14 and 15,) the two parts $T^2$ and V' thus forming the two members of a clutch. The periphery of the disk V' is beveled, as shown, while the interiors of the shoes R' $R^2$ $R^3$ $R^4$, next the disk V', are correspondingly beveled, so that when the shoes are compressed the disk V' will be pressed outward and the clutch members V' and $T^2$ disengaged, as in Fig. 11; but when the shoes are distended the springs $t^3$ in the hub of the sleeve $D^4$ will force the disk along the sleeve and cause the clutch members to engage and thus revolve the part T' with the sleeve $D^4$ and disk $T^2$.

When the motor is set in operation and so connected as to revolve the worm-gear D', as before described, the disk V' is revolved with it; but so long as the shoes R' $R^2$ $R^3$ $R^4$ are retained in their compressed position, as in Fig. 11, the disk V' is kept disengaged from the disk $P^2$ and nut T' and the conical disk $P^4$ is not affected. When, however, it is desired to connect the axle B with the worm-gear D', so as to revolve it, the shoes R' $R^2$ $R^3$ $R^4$ are released, when the springs $t^3$ behind the disk V' will force it along the hub-extension $D^4$, so that its clutch cavities engage with the lugs on the nut-disk $T^2$ and cause it to revolve, the screw-threads causing this revolving motion to move the casing $P^2$ $P^3$ along the axle until it engages with the disk P', when the casing is immediately set in motion by the frictional contact, and the casing being fast to the axle revolves the latter with it. As soon as the nut T' has compressed the casing $P^2$ $P^3$ upon the disk P' it moves with it, and all the parts thereafter revolve together.

When it is desired to disconnect the axle from the motor, the compression of the shoes R' R² R³ R⁴ acts first upon the disk V' and disengages it from the disk T², and, second, they compress the rubber ring T³ before they come in contact with the conical part P⁴ of the casing, thereby holding the nut stationary for a moment and starting it loose from the part P⁴ before the latter is compressed. By this means the axle may be readily and quickly connected to or disconnected from the worm-gear and the motor which drives it.

Having thus described my invention, what I claim as new is—

1. In means for connecting a motor with a street or other car, a shaft journaled upon the truck-frame and carrying a friction-clutch member and adapted to be constantly revolved by the motor, a worm-gear upon one of the axles of said car, a worm loose upon said shaft and engaging with said worm-gear and having a friction-brake disk and a friction-casing adapted to engage with said friction member, a sliding friction-collar within said friction-brake disk and revolving therewith and adapted to be normally engaged with said friction-clutch member, brake-shoes encompassing said friction-disk and adapted to be compressed thereon, and means whereby the compression of said brake-shoes also withdraws said friction-collar from its engagement with said friction member, whereby the power of said motor may be gradually applied to and removed from the axle.

2. In means for connecting a motor with a street or other car, the motor-shaft adapted to be constantly revolved and carrying a friction member, the axle of the car having worm-gear, a worm journaled upon said motor-shaft and having a friction-casing connected therewith, in which said friction member runs, and means whereby the revolving motion of said shaft may be applied to said worm and the inertia of the car utilized to gradually apply the power of the motor to the axle through the gradual contact of the friction-surfaces, substantially as and for the purpose set forth.

3. In means for connecting a motor with a street or other car, the motor-shaft having the clutch member and adapted to be constantly revolved and supported by bridge-frames A² A³ upon side bars A⁴ A⁵, the car-axle having the worm-gear D', a worm D³, journaled upon said motor-shaft and engaging with said worm-gear, brake-disk A¹⁰, having doubly-inclined external friction-surface, and friction-casing A¹¹ A¹², having doubly-inclined internal friction-surface and connected to said brake-disk and worm and inclosing said clutch member, friction-collar G' within said brake-disk and adapted to connect said brake-disk and friction member, brake-shoes E' E² E³ E⁴, inclosing said brake-disk and adapted to be compressed thereon, and disk H, connected to said friction-collar and adapted to be actuated by the compression of said brake-shoes to withdraw said friction-collar from contact with said friction member, substantially as and for the purpose set forth.

4. In means for connecting a motor with a street or other car, the motor-shaft A', carrying the double-surfaced clutch-head G², in combination with the casing A¹¹ A¹², united at their rims a³ and having the lining formed of wooden sections inserted into dovetailed channels in the casing, substantially as and for the purpose set forth.

5. The combination of a motor-shaft adapted to run constantly, a car-axle, a sleeve loose upon the motor-shaft, one member of a friction-clutch connected to said sleeve and the corresponding member of said friction-clutch adjacent thereto and fast on the motor-shaft, a brake-disk fast on said sleeve, one or more brake-shoes adapted to be compressed upon said brake-disk, and a worm and worm-gear connection between said sleeve and axle, substantially as and for the purpose set forth.

6. The combination of a motor-shaft adapted to run constantly, a car-axle, a sleeve loose upon the motor-shaft, one member of a friction-clutch connected to said sleeve and the corresponding member of said friction-clutch adjacent thereto and fast on the motor-shaft, a brake-disk fast on said sleeve, one or more brake-shoes adapted to be compressed on said brake-disk, a worm and worm-gear connection between said sleeve and axle, and an auxiliary friction-clutch member connected to said sleeve and adapted to automatically engage with the said member of the friction-clutch fast to the motor-shaft, whereby the initial revolving motion is imparted to said sleeve and worm-gear connection, substantially as and for the purpose set forth.

7. The combination of a motor-shaft adapted to run constantly, a car-axle, a sleeve loose upon the motor-shaft, one member of a friction-clutch connected to said sleeve and the corresponding member of said friction-clutch adjacent thereto and fast on the motor-shaft, a brake-disk fast on said sleeve, one or more brake-shoes adapted to be compressed on said brake-disk, a worm and worm-gear connection between said sleeve and axle, an auxiliary friction-clutch member attached to said sleeve and adapted to automatically engage with the said member of the friction-clutch fast to the motor-shaft, whereby the initial revolving motion is imparted to said sleeve and worm-gear connection, and a disk loose upon said sleeve and connected to said auxiliary clutch member and adapted to be moved longitudinally upon said sleeve by the action of said brake-shoes, whereby the auxiliary clutch member is withdrawn from engagement with the motor-shaft clutch member when the brake-shoes are applied, substantially as and for the purpose set forth.

8. The combination of a motor-shaft adapted to run constantly, a car-axle, a worm-gear connection between said motor and axle, means for connecting and disconnecting said motor and worm-gearing, one member of a friction-clutch fast to the hub of said worm-gear and the corresponding member of said friction-clutch connected to a sliding sleeve upon said axle, and means whereby the friction-clutch members may be connected and disconnected, substantially as and for the purpose set forth.

9. The combination of a motor-shaft adapted to run constantly, a car-axle, a worm-gear connection between said motor and axle, means for connecting and disconnecting said motor and worm-gearing, one member of a friction-clutch fast to the hub of said worm-gear and the corresponding member of said friction-clutch connected to a sliding sleeve upon said axle, one member of a friction-clutch fast on the hub of said worm, the corresponding member of said friction-clutch sliding upon said axle, but revolving therewith, and provided with a brake-disk, one or more brake-shoes adapted to compress said brake-disk, a collar having a flange and running loosely upon the hub of said worm-gear and having an external screw-thread engaging with a corresponding screw-thread upon the interior of said brake-disk, a rubber or other flexible ring upon the flange of said screw-collar and adapted to be engaged by said brake-shoes, a disk sliding upon said worm-gear hub, but revolving therewith, adjacent to said flanged screw-collar and brake-shoes and having a beveled periphery adapted to be engaged by said brake-shoes and with clutch-lugs adapted to engage with corresponding clutch-cavities in said screw-collar, and means whereby said brake-shoes may be compressed upon said brake-disk and flanged screw-collar, whereby said axle may be connected to or disengaged from said motor-driven worm-gearing, substantially as and for the purpose set forth.

10. In means for connecting a motor with a street or other car, a motor adapted to run continuously and with one member of a friction-clutch fast to the shaft thereof, the corresponding member of said friction-clutch loose upon said shaft and having a brake-disk and with worm-gear connection between it and the running-gear of said car, one or more brake-shoes embracing said friction-disk, and electric coils arranged adjacent to the movable ends of said brake-shoes and adapted when energized to actuate said brake-shoes, substantially as and for the purpose set forth.

11. In means for connecting a motor with a street or other car, a motor adapted to run continuously and with one member of a friction-clutch fast to the shaft thereof, the corresponding member of said friction-clutch loose upon said shaft and having a brake-disk and with worm-gear connection between it and the running-gear of said car, one or more brake-shoes embracing said friction-disk and with extended ends, frames $L'$ $L^2$ $L^3$ $L^4$, embracing said extended ends, coiled springs within said frames and bearing upon said extended ends, means for adjusting said springs, and electric coils adapted when energized to actuate said frames and brake-shoes, substantially as and for the purpose set forth.

In testimony whereof I have hereunto set my hand in the presence of two subscribing witnesses.

RICHARD W. THICKINS.

Witnesses:
  H. S. WEBSTER,
  C. N. WOODWARD.